United States Patent
Xu et al.

(10) Patent No.: US 12,457,312 B2
(45) Date of Patent: Oct. 28, 2025

(54) DATA TRANSMISSION METHOD, APPARATUS, AND DEVICE, AND STORAGE MEDIUM

(71) Applicants: ZTE CORPORATION, Shenzhen (CN); Shanghai Jiao Tong University, Shanghai (CN)

(72) Inventors: Yiling Xu, Shanghai (CN); Puyue Hou, Shanghai (CN); Linyao Gao, Shanghai (CN); Jun Sun, Shanghai (CN); Zhao Wu, Shenzhen (CN); Ping Wu, Shenzhen (CN); Qiuting Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 254 days.

(21) Appl. No.: 18/256,121

(22) PCT Filed: Dec. 2, 2021

(86) PCT No.: PCT/CN2021/135038
§ 371 (c)(1),
(2) Date: Jun. 6, 2023

(87) PCT Pub. No.: WO2022/117031
PCT Pub. Date: Jun. 9, 2022

(65) Prior Publication Data
US 2024/0040104 A1  Feb. 1, 2024

(30) Foreign Application Priority Data
Dec. 6, 2020  (CN) .......................... 202011418994.0

(51) Int. Cl.
*H04N 13/194* (2018.01)
(52) U.S. Cl.
CPC ................................ *H04N 13/194* (2018.05)

(58) Field of Classification Search
CPC .... H04N 13/194; H04N 19/597; H04N 19/70; H04N 21/21805; H04N 21/4728;
(Continued)

(56) References Cited

U.S. PATENT DOCUMENTS 11,836,876 B2 *  12/2023  Otsuki ................. H04L 67/131
12,183,046 B2 *  12/2024  Lim ........................ H04L 65/70
(Continued)

FOREIGN PATENT DOCUMENTS

CN    111402423 A    7/2020
CN    112601066 A    4/2021
(Continued)

OTHER PUBLICATIONS

Extended European Search Report of Application No. 21900057.7, dated Oct. 4, 2024, 7 pages including translation.
(Continued)

*Primary Examiner* — Tracy Y. Li
(74) *Attorney, Agent, or Firm* — Morgan, Lewis & Bockius LLP

(57) ABSTRACT

Provided are a data transmission method, apparatus and device, and a storage medium. The data transmission method includes the following: receiving current status information sent by a client; determining status-dependent point cloud spatial region information corresponding to the current status information according to the current status information; selecting status-dependent point cloud spatial region data corresponding to the status-dependent point cloud spatial region information; and sending the status-dependent point cloud spatial region information and the status-dependent point cloud spatial region data to the client.

20 Claims, 5 Drawing Sheets

(58) Field of Classification Search
CPC ......... H04N 21/6587; H04N 21/85406; H04N 21/816; H04N 19/42; H04N 21/84
See application file for complete search history.

(56) References Cited

U.S. PATENT DOCUMENTS

| | | | |
|---|---|---|---|
| 2019/0379884 A1* | 12/2019 | Oh | ........................ H04N 19/167 |
| 2020/0236441 A1* | 7/2020 | Moon | .............. H04N 21/47217 |
| 2020/0304834 A1 | 9/2020 | Wang | |
| 2021/0005006 A1* | 1/2021 | Oh | .................. H04N 21/85406 |

FOREIGN PATENT DOCUMENTS

| | | |
|---|---|---|
| WO | WO-2020189895 A1 | 9/2020 |
| WO | WO-2020190093 A1 | 9/2020 |

OTHER PUBLICATIONS

"Technologies under consideration on carriage of V-PCC data", 129. MPEG Meeting; Jan. 13-Jan 17, 2020; Brussels; (Motion Picture Expert Group or ISO/IEC JTC1/SC29/WG11), No. n19021 Feb. 8, 2020 (Feb. 8, 2020), XP030285339, Retrieved from the Internet: URL:http://phenix.int-evry.fr/mpeg/doc_end_user/documents/129_Brussels/wg11/w19021.zip N19021—Technologies under consideration for carriage of V-PCC data-clean-vl.docx.

International Search Report in Application No. PCT/CN2021/135038, dated Feb. 11, 2022, 4 pages, including translation.

\* cited by examiner

DATA TRANSMISSION METHOD, APPARATUS, AND DEVICE, AND STORAGE MEDIUM

CROSS REFERENCE TO RELATED APPLICATIONS

This is a National Stage Application, filed under 35 U.S.C. 371, of International Patent Application No. PCT/CN2021/135038, filed on Dec. 2, 2021, which claims priority to Chinese Patent application Ser. No. 20/2011418994.0 filed with the China National Intellectual Property Administration (CNIPA) on Dec. 6, 2020, the disclosures of which are incorporated herein by reference in their entireties.

TECHNICAL FIELD

The present application relates to the communication field, for example, a data transmission method, apparatus and device, and a storage medium.

BACKGROUND

A point cloud refers to a set of points with some attributes, including information such as color, a normal vector, reflection intensity and material, in the three-dimensional space, and due to lifelike presentation attributes, the point cloud has been introduced into many immersive media fields, such as the augmented reality (AR)/virtual reality (VR), the 3-dimension (3D) printing and the holographic communication technology. Different from the conventional three-dimensional grid, the point cloud abandons the topological structure of various points in the space, so that simpler and more efficient acquisition and presentation are implemented. As point cloud data, the point cloud is a point set of spatial structure information and corresponding feature information of a geometric entity, and the spatial structure information and corresponding feature information are acquired by an array of high-definition acquisition devices and depth information acquisition devices (depth information includes Red-Green-Blue+Depth (RGBD) maps). As one of the main carriers for presenting information in immersive multimedia scenarios, the point cloud can effectively represent static objects and scenarios as well as dynamic objects and real-time scenarios in immersive media services. As the three-dimensional scanning technology and system mature, features, such as the surface information and the depth information, of point cloud data are more abundant and more widely used in various image processing fields.

Coding compression algorithms of the point cloud have been studied systematically and may be classified as video-based point cloud coding (V-PCC) and geometry-based point cloud coding (G-PCC). The V-PCC compression algorithm, in short, divides the point cloud data into different spatial regions which are defined and described in a three-dimensional global coordinate system, and then these spatial regions are mapped into two-dimensional images. The mapped two-dimensional images are compressed and coded by using conventional video coding standards, such as H.265/high efficiency video coding (HEVC) and H.266/versatile video coding (VVC), and spatial region information containing a mapping relationship between the spatial regions and the two-dimensional images, the corresponding two-dimensional image coding data and other information are finally encapsulated as point cloud media data.

The rich feature information of the point cloud results in a huge amount of data of the compressed and coded point cloud, therefore, how to achieve efficient point cloud media data transmission according to user feedback information becomes one of the key points in research of the point cloud transmission technology.

An immersive point cloud game application is taken as an example. At a moment or during a time period, users in the game actually need to use only part of the point cloud data. If all of the point cloud data is transmitted to the users at this time, on the one hand, the transmission of the point cloud data occupies a relatively large bandwidth, on the other hand, the requirements for performance of a game client may also be relatively high since the game client needs to process a large amount of point cloud data.

SUMMARY

Embodiments of the present application provide a data transmission method, apparatus and device, and a storage medium, so that data is transmitted selectively according to current status information, consumption requirements of users for point cloud media real-time interaction experience are satisfied, and data transmission efficiency is improved.

An embodiment of the present application provides a data transmission method applied to a server side. The method includes the following.

Current status information sent by a client is received; corresponding status-dependent point cloud spatial region information is determined according to the current status information; status-dependent point cloud spatial region data corresponding to the status-dependent point cloud spatial region information is selected; and the status-dependent point cloud spatial region information and the status-dependent point cloud spatial region data are sent to the client.

An embodiment of the present application provides a data transmission method applied to a client. The method includes the following.

Pre-acquired current status information is sent to a server side; status-dependent point cloud spatial region information and status-dependent point cloud spatial region data which correspond to the pre-acquired current status information and are sent by the server side are received; and the status-dependent point cloud spatial region information and the status-dependent point cloud spatial region data are processed.

An embodiment of the present application provides a data transmission apparatus applied to a server side. The apparatus includes a receiver, a determination module, a selector and a sender.

The receiver is configured to receive current status information sent by a client; the determination module is configured to determine corresponding status-dependent point cloud spatial region information according to the current status information; the selector is configured to select status-dependent point cloud spatial region data corresponding to the status-dependent point cloud spatial region information; and the sender is configured to send the status-dependent point cloud spatial region information and the status-dependent point cloud spatial region data to the client.

An embodiment of the present application provides a data transmission apparatus applied to a client. The apparatus includes a sender, a receiver and a processor.

The sender is configured to send pre-acquired current status information to a server side; the receiver is configured to receive status-dependent point cloud spatial region information and status-dependent point cloud spatial region data which correspond to the pre-acquired current status information and are sent by the server side; and the processor is configured to process the status-dependent point cloud spatial region information and the status-dependent point cloud spatial region data.

An embodiment of the present application provides a device. The device includes a communication module, a memory and one or more processors. The communication module is configured to perform communication and interaction between a server side and a client; the memory is configured to store one or more programs which, when executed by the one or more processors, cause the one or more processors to implement the data transmission method according to any one of the preceding embodiments.

An embodiment of the present application provides a storage medium. The storage medium stores a computer program which, when executed by a processor, implements the data transmission method according to any one of the preceding embodiments.

DETAILED DESCRIPTION

Embodiments of the present application are described below in conjunction with drawings. The present application is described below in conjunction with the embodiments and the drawings, and examples are given only for explaining the present application.

Figure 1:
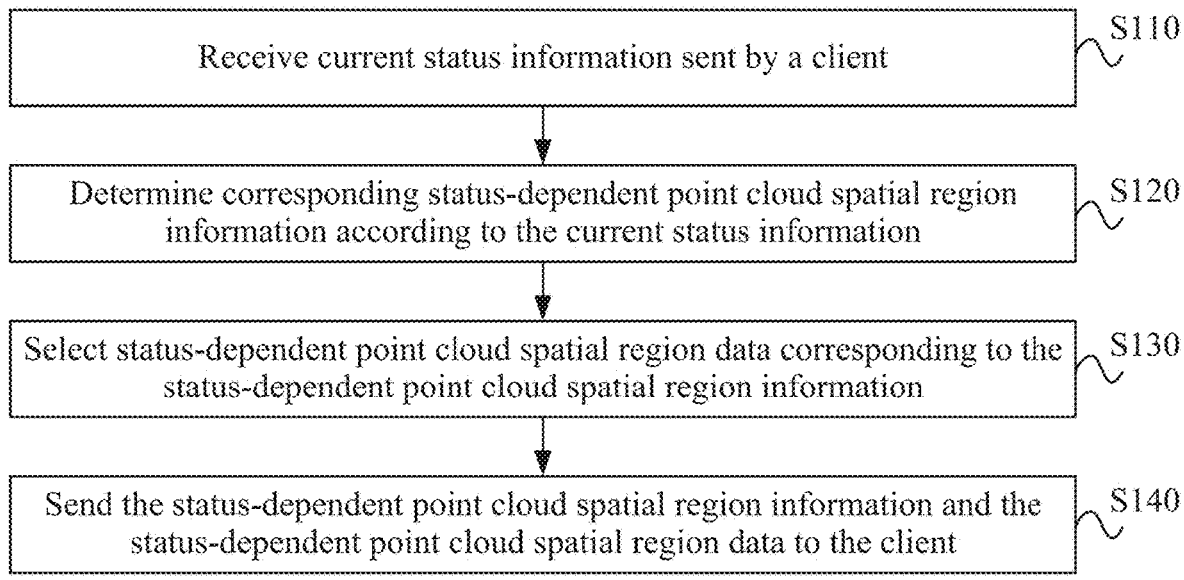
FIG. 1 is a flowchart of a data transmission method according to an embodiment of the present application.

In an embodiment, FIG. 1 is a flowchart of a data transmission method according to an embodiment of the present application. The embodiment is applied to a server side. As shown in FIG. 1, the embodiment includes S110 to S140.

In S110, current status information sent by a client is received.

In an embodiment, the current status information includes one of the following: the current viewing position of a user using the client and the current viewing direction of the user using the client; the current body position of the user using the client and the current body direction of the user using the client; the current position of the user using the client and the current movement information of the user using the client; or the current partial-body position of the user using the client and the current partial-body motion of the user using the client. In an embodiment, the current status information may be preset status information. For example, the client selects a piece of status information sequentially from a preset status information table as the current status information, and sends the current status information to the server side.

In an embodiment, representation manners of the current viewing position, the body position of the user, the current position of the user and the partial-body position of the user all include three-dimensional coordinates in a global coordinate system. A representation manner of the body direction of the user includes a unit vector of a local coordinate system with the body position of the user as the origin. A representation manner of the current viewing direction includes a unit vector of a local coordinate system with the current viewing position as the origin.

In S120, corresponding status-dependent point cloud spatial region information is determined according to the current status information.

In an embodiment, the status-dependent point cloud spatial region information includes one of the following: the number of spatial regions, a spatial region index, an anchor of each spatial region, the shape of each spatial region, or the size of each spatial region.

In S130, status-dependent point cloud spatial region data corresponding to the status-dependent point cloud spatial region information is selected.

In S140, the status-dependent point cloud spatial region information and the status-dependent point cloud spatial region data are sent to the client.

In the embodiment, the server side determines the corresponding status-dependent point cloud spatial region information according to the received current status information, selects the status-dependent point cloud spatial region data corresponding to the status-dependent point cloud spatial region information from a media library of the server side, and sends the status-dependent point cloud spatial region data to the client, so that the client only needs to process the status-dependent point cloud spatial region data corresponding to the current status information, thus reducing the amount of data transmitted by the server side and improving the data processing efficiency of the client.

In an embodiment, before the current status information sent by the client is received, the method further includes the following:

A media asset request sent by the client is received; and media asset description information corresponding to the media asset request is sent to the client.

In an embodiment, the media asset description information includes a status dependent flag and media asset initial information. The status dependent flag is used for indicating whether a media asset corresponding to the media asset description information contains status-dependent point cloud spatial region data corresponding to the media asset initial information.

In an embodiment, the media asset initial information includes initial status information and status-dependent point cloud spatial region information.

In an embodiment, the initial status information includes one of the following: media asset initial viewing information; initial body position information of a user using the client and an initial body direction of the user using the client; an initial position of the user using the client and initial movement information of the user using the client; an initial partial-body position of the user using the client and an initial partial-body motion of the user using the client; or last status information when the client uses the current media asset last time. The media asset initial viewing information includes one of an initial viewing position of the user or an initial viewing direction of the user.

In an embodiment, representation manners of the initial viewing position of the user, the initial body position information of the user using the client, the initial position of the user using the client and the initial partial-body position of the user using the client all include three-dimensional coordinates in the global coordinate system. A representation manner of the initial viewing direction of the user includes a unit vector of a local coordinate system with the initial viewing position as the origin. A representation manner of the initial body direction of the user using the client includes a unit vector of a local coordinate system with the initial body position of the user using the client as the origin.

In an embodiment, the data transmission method applied to the server side further includes the following:

A request sent by the client and for the status-dependent point cloud spatial region information and status-dependent point cloud spatial region data both corresponding to the initial status information is received; and the status-dependent point cloud spatial region information and the status-dependent point cloud spatial region data both corresponding to the initial status information are sent to the client.

Figure 2:
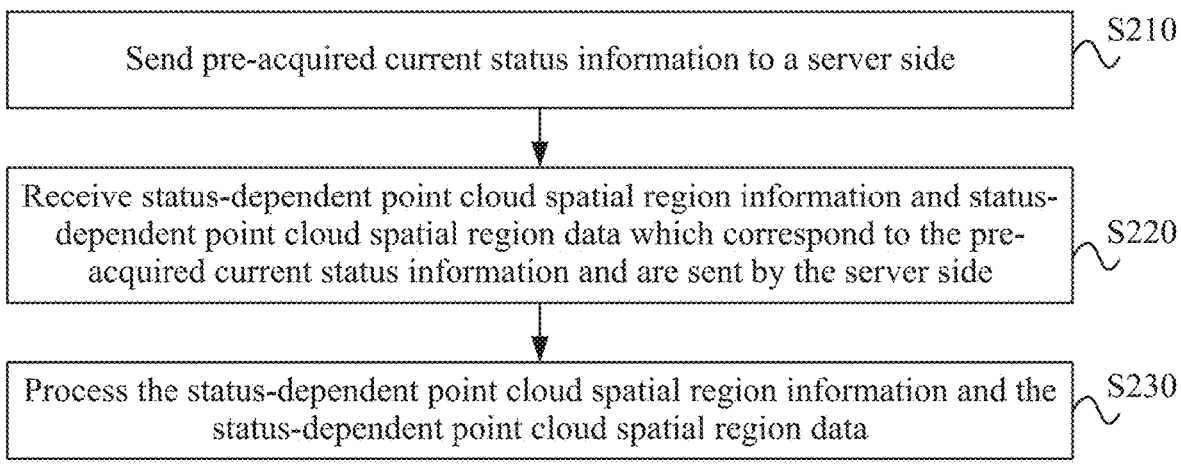
FIG. 2 is a flowchart of another data transmission method according to an embodiment of the present application.

FIG. 2 is a flowchart of another data transmission method according to an embodiment of the present application. The embodiment is applied to a client. As shown in FIG. 2, the embodiment includes S210 to S230.

In S210, pre-acquired current status information is sent to a server side.

In S220, status-dependent point cloud spatial region information and status-dependent point cloud spatial region data which correspond to the pre-acquired current status information and are sent by the server side are received.

In S230, the status-dependent point cloud spatial region information and the status-dependent point cloud spatial region data are processed.

In an embodiment, before the pre-acquired current status information is sent to the server side, the method further includes the following:

A media asset request is sent to the server side; and media asset description information corresponding to the media asset request and sent by the server side is received.

In an embodiment, the media asset description information includes a status dependent flag and media asset initial information. The status dependent flag is used for indicating whether a media asset corresponding to the media asset description information contains status-dependent point cloud spatial region data corresponding to the media asset initial information.

In an embodiment, the media asset initial information includes initial status information and status-dependent point cloud spatial region information.

In an embodiment, before the pre-acquired current status information is sent to the server side, the method further includes the following:

The status-dependent point cloud spatial region information and the status-dependent point cloud spatial region data which correspond to the initial status information and are sent by the server side are received.

Figure 3:
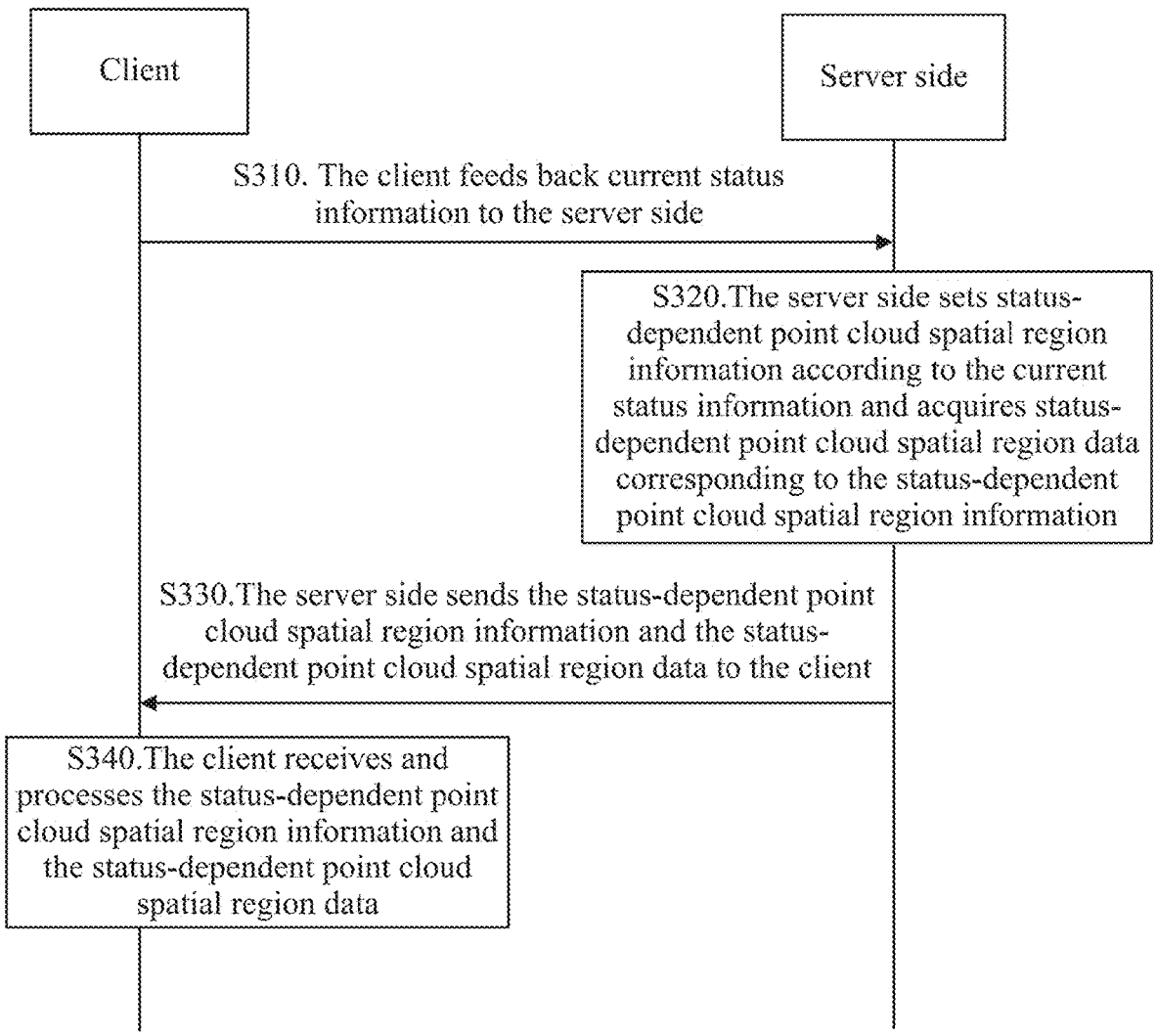
FIG. 3 is a diagram illustrating interaction of a type of data transmission according to an embodiment of the present application.

In an embodiment, FIG. 3 is a diagram illustrating interaction of one type of data transmission according to an embodiment of the present application. The embodiment describes a data interaction process between a client and a server side. As shown in FIG. 3, the embodiment includes S310 to S340. In an actual communication process, when the client uses the current media asset, S310 to S340 may be executed in a loop.

In S310, the client feeds back current status information to the server side.

In the embodiment, the current status information may be the current status of a user using the client, such as a viewing position of the user and a viewing direction of the user, a body position of the user and a body orientation of the user, or a position and movement information of the user. The current status information may be preset status information.

In S320, the server side sets status-dependent point cloud spatial region information according to the current status information and acquires status-dependent point cloud spatial region data corresponding to the status-dependent point cloud spatial region information.

In the embodiment, the status-dependent point cloud spatial region data refers to part of point cloud spatial region data selected from point cloud data according to the current status information based on a preset rule.

The preset rule may be that point cloud spatial region data selected by the server side and sent to the client is viewable by the user when the user views the point cloud at a viewing position and in a viewing direction. As long as a point that can be viewed by the user exists in a point cloud space, this point cloud space is marked as being viewable. For example, according to the viewing position of the user and the viewing direction of the user, the server side selects status-dependent point cloud spatial region information and status-dependent point cloud spatial region data which are viewable by the user, and sends the status-dependent point cloud spatial region information and the status-dependent point cloud spatial region data to the client, so that the client decodes and presents the status-dependent point cloud spatial region information and the status-dependent point cloud spatial region data.

In S330, the server side sends the status-dependent point cloud spatial region information and the status-dependent point cloud spatial region data to the client.

In S340, the client receives and processes the status-dependent point cloud spatial region information and the status-dependent point cloud spatial region data.

Figure 4:
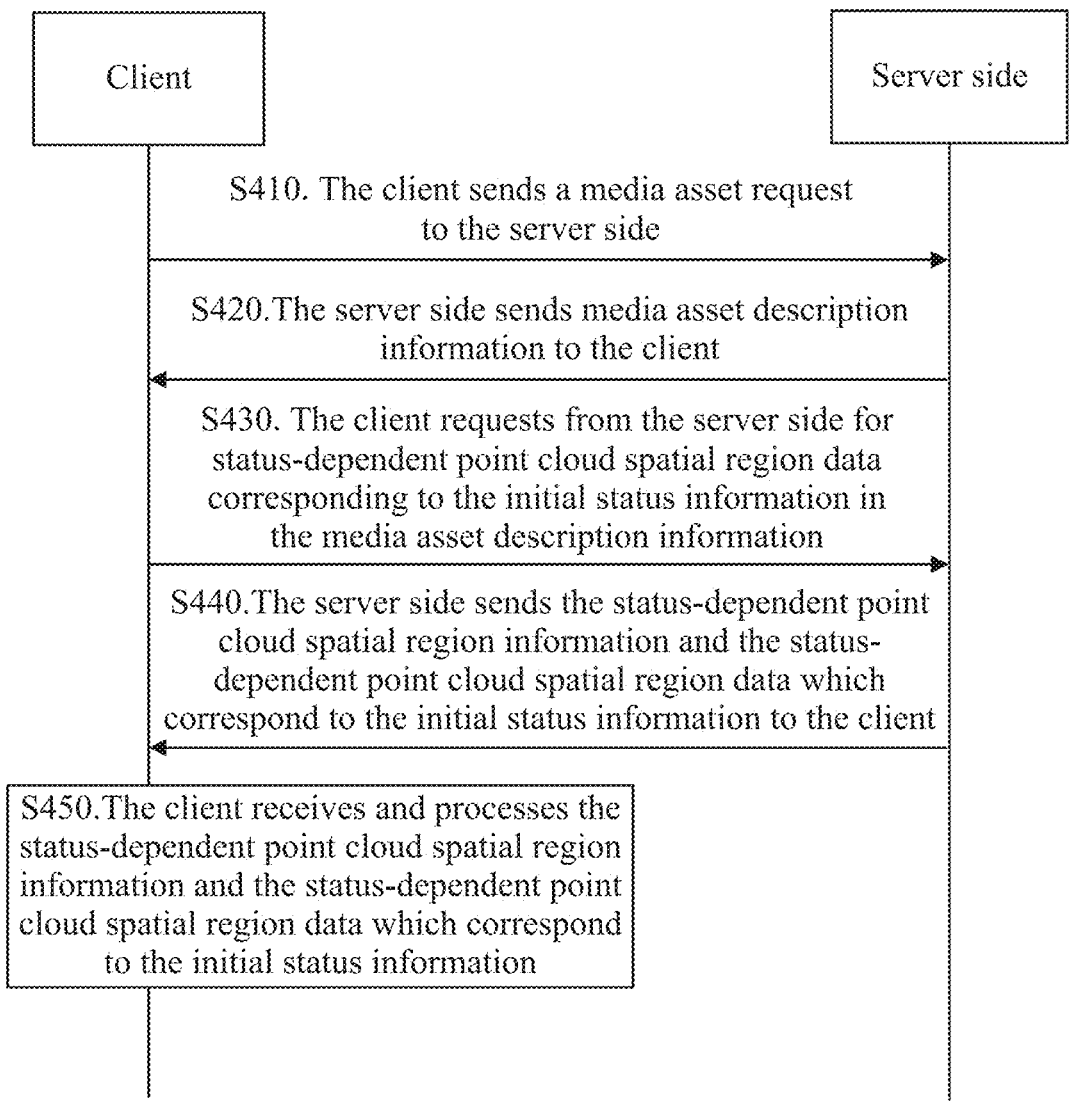
FIG. 4 is a diagram illustrating interaction of another type of data transmission according to an embodiment of the present application.

In an embodiment, FIG. 4 is a diagram illustrating interaction of another type of data transmission according to an embodiment of the present application. In the embodiment, a data interaction process between a client and a server side is illustrated through an example where point cloud media data corresponding to initial status information is transmitted between the client and the server side. As shown in FIG. 4, the embodiment includes S410 to S450.

In S410, the client sends a media asset request to the server side.

A media asset refers to point cloud media data. In the embodiment, the media asset may be point cloud media data in one scenario or a combination of point cloud media data in multiple scenarios.

In S420, the server side sends media asset description information to the client.

In the embodiment, the media asset description information contains a status dependent flag and media asset initial information.

The status dependent flag is used for indicating whether a media asset corresponding to the media asset description information contains status-dependent point cloud spatial region data corresponding to the media asset initial information.

The media asset initial information includes the initial status information and status-dependent point cloud spatial region information.

The initial status information may be media asset initial viewing information, that is, a viewing position and a viewing direction.

The status-dependent point cloud spatial region information is used for indicating part of point cloud regions, and the status-dependent point cloud spatial region information only exists in a case where the media asset contains status-dependent point cloud spatial region data.

In S430, the client requests from the server side for status-dependent point cloud spatial region information and status-dependent point cloud spatial region data which correspond to the initial status information.

In S440, the server side sends the status-dependent point cloud spatial region information and the status-dependent point cloud spatial region data which correspond to the initial status information to the client.

In S450, the client receives and processes the status-dependent point cloud spatial region information and the status-dependent point cloud spatial region data which correspond to the initial status information.

In an embodiment, in a case where the client needs to use a new media asset, S410 to S450 are executed again.

In an embodiment, the server side sends part of point cloud media data to the client according to the initial status information in the media asset description information. It is to be understood as that the server side may directly send the media asset description information to the client without a request from the client to the server side, that is, S420 to S450 are directly executed.

In an embodiment, the server side sends part of point cloud media data to the client according to the initial status information in the media asset description information. It is to be understood as that the server side may directly send the media asset description information and the status-dependent point cloud spatial region data corresponding to the initial status information to the client without a request from the client to the server side, that is, S440 to S450 are directly executed.

In an embodiment, when the client requests for the media asset from the server side, S410 to S450 are executed; when the client uses the media asset, S310 to S340 are executed in a loop. In the case where the client needs to request a new media asset from the server side, S410 to S450 are executed again.

In an embodiment, the current status information may be the current viewing position and the current viewing direction of a user using the client, a body position and body orientation of a user using the client, the current position and movement information of a user using the client, or a partial-body position and a partial-body motion of a user using the client. Exemplarily, the partial-body position and the partial-body motion of the user may be a position of a hand and a motion type of the hand.

In the embodiment, all of the preceding positions (such as the current viewing position of the user, the body position of the user, the current position of the user, and the partial-body position of the user) may be represented by three-dimensional coordinates in global coordinate axes. All of the preceding viewing directions (such as the current viewing direction of the user and the body orientation of the user) may be represented by a unit vector in a local coordinate system with the corresponding position as the origin.

In an embodiment, the current status information may be the current viewing position of the user, the current viewing direction of the user, and the shape of the current viewing region of the user. From the above information, the server side may uniquely determine the region viewed by the user. The shape type of the current viewing region of the user may be a cuboid structure, a frustum structure, a round frustum structure and a sphere region structure.

In an embodiment, the initial status information may be one of all the preceding preset status information, or may be the last status information when the client uses the current media asset last time.

In an embodiment, the status-dependent point cloud spatial region information may include one of the following: the number of spatial regions, a spatial region index, the shape of each spatial region, an anchor of each spatial region, or the size of each spatial region.

In an embodiment, the number of spatial regions refers to the number of spatial regions in the status-dependent point cloud region data, these spatial regions contain part of the point cloud in the media asset, and the number may be one or more.

In an embodiment, the spatial region index refers to a point cloud spatial region identifier of a spatial region in the media asset, and the spatial region is in the status-dependent point cloud region data and contains part of the point cloud. The server side may retrieve corresponding spatial region data from the media asset through the spatial region index, and forms the spatial region data into status-dependent point cloud spatial region data.

In an embodiment, the shape of a spatial region, the anchor of the spatial region and the size of the spatial region define the spatial region in a three-dimensional coordinate system. For example, the shape of the spatial region may be a cube, the anchor of the spatial region may be a center point of the cube and represented by a three-dimensional coordinate in the global coordinate system, and the size of the spatial region may refer to the length, the width and the height of the cube. For another example, the shape of the spatial region may be a cube, the anchor of the spatial region may be any vertex of the cube, and the size of the spatial region may refer to the length, the width and the height of the cube. For another example, the shape of the spatial region is a sphere, the anchor of the spatial region is the center of the sphere, and the size of the spatial region refers to the radius of the sphere.

In an embodiment, the rule for selecting the status-dependent point cloud spatial region data according to the current status information may be setting the shape of the viewing region of the user, such as the cuboid structure, the frustum structure, the round frustum structure and the sphere region structure. For example, the server side may select the viewing point cloud spatial region in different shapes according to the viewing position of the user and the viewing direction of the user.

In an embodiment, the rule for selecting the status-dependent point cloud spatial region data according to the current status information may include determining the next movement status of the user according to the current position information, current orientation information and movement information of the user, and selecting the status-dependent point cloud spatial region data. For example, the movement information of the user refers to a movement direction of the user and a movement distance of the user, then the next position of the user and the next orientation of the user may be determined by using the current position information of the user, the orientation information of the user, the movement direction of the user and the movement distance of the user. In this manner, the corresponding status-dependent point cloud spatial region data may be determined according to the new position and the new orientation.

In an embodiment, the rule for selecting the status-dependent point cloud spatial region data according to the current status information may include determining a spatial region touched by a hand according to a hand position and a hand motion of the user and using the spatial region as the status-dependent point cloud spatial region. For example, the hand performs a grasping motion at the current hand position, and then a point cloud spatial region grasped by the hand may be selected as the status-dependent point cloud spatial region.

In an embodiment, the client may request more spatial regions than actual requirements from the server side, and the server side may also issue more spatial regions than the actual requirements to the client. For example, the client actually needs a 3×3×3 spatial region, where 3 refers to 3 unit coordinate values in the global coordinate system, while the client may request a 5×5×5 spatial region from the server side, where 5 refers to 5 unit coordinate values in the global coordinate system.

In an embodiment, both the status-dependent point cloud spatial region information and the status-dependent point cloud spatial region data may be superimposed. For example, the client first applies to the server side for point cloud spatial region data viewed in direction A at view point A; the server sends corresponding status-dependent point cloud spatial region information A and corresponding status-dependent point cloud spatial region data A to the client; after decoding and displaying the status-dependent point cloud spatial region data A, the client retains the information A and data A; then the client applies to the server side for point cloud region space data viewed in direction B at view point B; the server sends corresponding status-dependent point cloud spatial region information B and corresponding status-dependent point cloud spatial region data B to the client; and after decoding and displaying the status-dependent point cloud spatial region data B, the client retains the information B and data B. At the same time, the client superimposes the information A onto the information B to obtain new information C, and superimposes the data A onto the data B to obtain data C. In this case, the server side may progressively transmit point cloud spatial region data to the client in the preceding superimposition manner, and the client may also progressively request the server to transmit the point cloud spatial region data in this superposition manner.

In an embodiment, the point cloud spatial region data may be obtained through multi-frame point cloud fusion coding (combine frame coding).

In an embodiment, the implementation of the media asset description information in the preceding embodiments is illustrated. The media asset description information is used for notifying a receiving end and an application program of content of the current media asset carrying the point cloud content, and includes a status dependent flag and media asset initial information. Exemplarily, an implementation of the media asset description information is as follows:

```
Asset_information_descriptor ( ){
    unsigned int(16) descriptor_tag;
    unsigned int(16) descriptor_length;
    unsigned int(1) StatusDependent_flag;
    InitialStatusInformation( );
    if (StatusDependent_flag==1) {
```

-continued

```
        SD_SpatialRegionsStruct( );
    }
}.
``` descriptor tag is used for representing the type of the media asset description information.

descriptor length is used for specifying a byte length from a byte next to this field to the last byte of the media asset description information.

StatusDependent_flag is used for indicating whether the media asset corresponding to the media asset description information contains status-dependent point cloud spatial region data corresponding to the initial status information. For example, when StatusDependent_flag is 1, it represents that the media asset contains the status-dependent point cloud spatial region data; and when StatusDependent_flag is 0, it represents that the media asset does not contain the status-dependent point cloud spatial region data.

InitialStatusInformation( ) is used for representing the initial status information of the media asset.

SD_SpatialRegionsStruct( ) is used for representing status-dependent point cloud spatial region information, that is, information of partial regions in point cloud media content. SD_SpatialRegionsStruct exists only when StatusDependent_flag is equal to 1.

Figure 5:
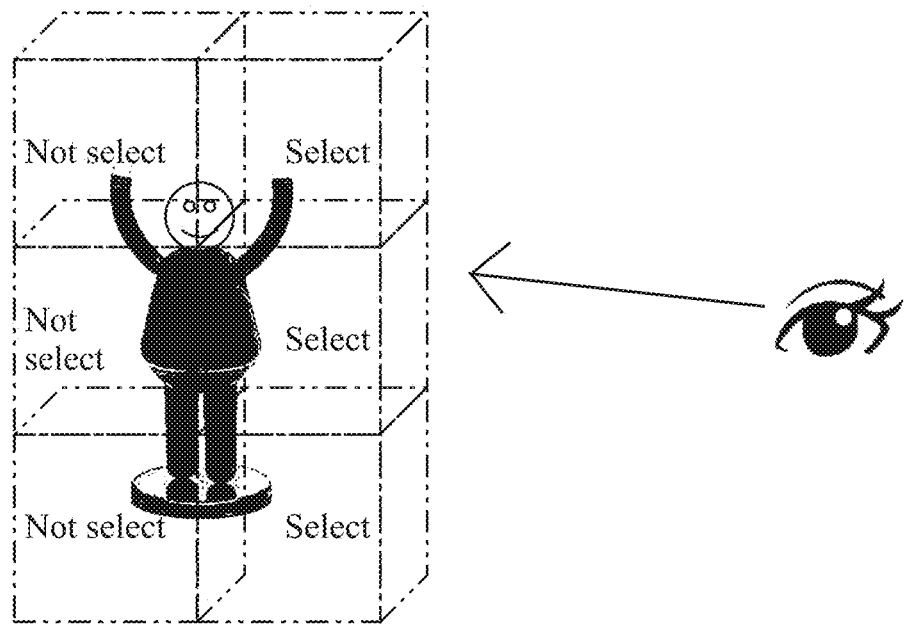
FIG. 5 is a diagram illustrating a process in which a status-dependent point cloud spatial region is selected based on current status information according to an embodiment of the present application.

Exemplarily, FIG. 5 is a diagram illustrating a process in which a status-dependent point cloud spatial region is selected based on the current status information according to an embodiment of the present application. In a case where the current status information refers to view information (that is, the current viewing position and the current viewing direction of the user using the client) of the user, the implementation of the media asset description information is as follows:

```
V3C_information_descriptor ( ){
    unsigned int(16) descriptor_tag;
    unsigned int(16) descriptor_length;
    unsigned int(1) ViewDependent_flag;
    InitialViewInformation( );
    if (ViewDependent_flag==1) {
        VD_SpatialRegionsStruct( );
    }
}.
```

V3C is an abbreviation of visual volumetric video-based coding, and information parameters are all relevant to the viewing view.

descriptor tag is used for representing the type of the media asset description information.

descriptor length is used for specifying a byte length from a byte next to this field to the last byte of the media asset description information.

ViewDependent_flag is used for indicating whether the media asset corresponding to the media asset description information contains view-dependent point cloud spatial region data corresponding to the initial status information. For example, when ViewDependent_flag is 1, it represents that the media asset contains view-dependent point cloud spatial region data; and when ViewDependent_flag is 0, it represents that the media asset does not contain the view-dependent point cloud spatial region data.

InitialViewInformation( ) is used for representing initial view information of the media asset.

VD_SpatialRegionsStruct( ) is used for representing view-dependent point cloud spatial region information, that is, information of partial regions in point cloud media content. VD_SpatialRegionsStruct exists only when ViewDependent_flag is equal to 1.

In an embodiment, the implementation of the status-dependent point cloud spatial region information in the preceding embodiments is illustrated. Exemplarily, the implementation of the status-dependent point cloud spatial region information is as follows:

```
aligned(8) class SD_SpatialRegionsStruct( ) {
    unsigned int(16) num_SD_regions;
    for (i=0; i<num_SD_regions; i++) {
        3D_SpatialRegionStruct( );
    }
}.
``` num_SD_regions is used for presenting the number of point cloud spatial regions contained in the status-dependent point cloud spatial region data, and the number may be one or more.

3DSpatialRegionStruct( ) is used for representing point cloud spatial region information. In the embodiment, each space has its corresponding region information, and the point cloud spatial region information may include the shape of a spatial region, the anchor of the spatial region and the size of the spatial region. Exemplarily, the implementation of the point cloud spatial region information is as follows:

```
aligned(8) class 3DSpatialRegionStruct( ) {
    unsigned int(16) 3d_region_id;
    unsigned int(8) Region_shape;
    3DPoint anchor;
    if(Region_shape == 0){
        CuboidRegionStruct( );
    }else if(Region_shape == 1){
        SphereRegion Struct( )
    }
}.
```

3d_region_id is used for representing a spatial region identifier. In the embodiment, different point cloud spatial regions may be determined using the spatial region identifier.

Region_shape is used for representing the shape of a spatial region. Exemplarily, when Region_shape is 0, it represents that the shape of the spatial region is a cube; when Region_shape is 1, it represents that the shape of the spatial region is a sphere, and other values are reserved.

anchor is used for representing the anchor of a spatial region, and may be represented by using three-dimensional coordinates in the global coordinate system. Exemplarily, the implementation of the anchor of the spatial region is as follows:

```
aligned(8) class 3DPoint( ) {
    unsigned int(16) x;
    unsigned int(16) y;
    unsigned int(16) z;
}.
``` x is used for representing an x-coordinate value of the anchor of the spatial region in the global coordinate system.
y is used for representing a y-coordinate value of the anchor of the spatial region in the global coordinate system.
z is used for representing a z-coordinate value of the anchor of the spatial region in the global coordinate system.

In an embodiment, when the shape of the spatial region is a cube, the implementation of the spatial region is as follows:

```
aligned(8) class CuboidRegionStruct( ) {
    unsigned int(16) cuboid_dx;
    unsigned int(16) cuboid_dy;
    unsigned int(16) cuboid_dz;
}.
``` cuboid_dx, cuboid_dy and cuboid_dz respectively represent sizes of a cubic region in a local coordinate system with the anchor of the spatial region as the coordinate origin along x axis, y axis and z axis of the local coordinate system with respect to the anchor.

In an embodiment, when the shape of the spatial region is a sphere, the implementation of the size of the spatial region is as follows:

aligned(8) class SphereRegionStruct( ) {
  unsigned int(16) sphere_r;
}.

sphere_r represents the radius of the spherical spatial region.

In an embodiment, the implementation of the current status information in the preceding embodiments is illustrated. Exemplarily, the current status information may include the current viewing position of the user and the current viewing direction of the user, and the implementation of the current status information is as follows:

```
aligned(8) class StatusInformation( ){
    unsigned int(16) posx;
    unsigned int(16) posy;
    unsigned int(16) posz;
    signed int(32) dirx;
    signed int(32) diry;
    signed int(32) dirz;
}.
``` posx is used for indicating an x-axis coordinate value of the current viewing position in the global coordinate system.
posy is used for indicating a y-axis coordinate value of the current viewing position in the global coordinate system.
posz is used for indicating a z-axis coordinate value of the current viewing position in the global coordinate system.
dirx is used for indicating an x-axis coordinate value of the current viewing direction in a local coordinate system with the current viewing position as the origin.
diry is used for indicating a y-axis coordinate value of the current viewing direction in the local coordinate system with the current viewing position as the origin.
dirz is used for indicating a z-axis coordinate value of the current viewing direction in the local coordinate system with the current viewing position as the origin.

The preceding position information and direction information may also be used for indicating information about the position of the user and the orientation of the user.

In an embodiment, for the preceding user feedback information sent by the client to the server side, the transmission of the user feedback information is illustrated through the International Organization for Standardization/International Electrotechnical Commission (ISO/IEC) 23008-1 Information technology High efficiency coding and media delivery in heterogeneous environments Part 1: Moving Picture Experts Group (MPEG) Media Transport (MMT) protocol and the Smart Media Transport (SMT) protocol.

In an embodiment, to transmit V3C point cloud content in ISO/IEC 23090-10 format using the MMT transmission protocol and achieve the consumption of point cloud media content based on the user feedback information, a V3C information descriptor and signaling of a point cloud specific application need to be defined according to ISO/IEC 23090-10 specification, where an application signaling message is defined for the application program and allows information for the application program to be transferred.

To support the transfer of V3C content using the MMT, data of a single point cloud spatial region is written into an asset in the form of an ISO Base Media File Format (ISOBMFF) V3C container, and one or more assets are encapsulated into data packets. Each data packet contains asset data of all multi-track content corresponding to the single point cloud spatial region. To transmit V3C coded data in the form of a media stream using the MMT, a V3C-specific signaling message is defined as follows: the V3C-specific signaling message should have an application identifier with an urn value of "urn:mpeg:mmt:app:v3c:2020".

In the application program-specific signaling message, the following application messages are defined:

V3CStatusChangeFeedback is used for the client to transmit the current status information to the server side; V3CStatusDependentPacketInformation is used for the server side to indicate data packet index information and the number of point cloud media data packets where status-dependent point cloud spatial region data is located, and corresponding status-dependent point cloud spatial region information to the client.

Exemplarily, the implementation of the V3C information descriptor based on the MMT transmission protocol is described below.

The V3C information descriptor defines content used for notifying the receiving end and the application program of the current media asset carrying the point cloud content, and contains a status dependent flag and media asset initial information, as shown in Table 1.

TABLE 1

Table of an implementation of V3C media asset description information

| Syntax | Values | No. Of bits | Mnemonic |
|---|---|---|---|
| V3C_information_descriptor ( ){ | | | |
| descriptor_tag | | 16 | uimsbf |
| descriptor_length | | 16 | uimsbf |
| StatusDependent_flag | | 1 | bslbf |
| InitialStatusInformation( ) | | | |
| if (StatusDependent_flag == 1) { | | | |
| SD_SpatialRegionsStruct( ) | | | |
| } | | | |
| } | | | | descriptor tag is used for representing the type of the media asset description information.

descriptor length is used for specifying a byte length from a byte next to this field to the last byte of the media asset description information.

StatusDependent_flag is used for indicating whether the media asset corresponding to the media asset description information contains status-dependent point cloud spatial region data corresponding to the initial status information. For example, when StatusDependent_flag is 1, it represents that the media asset contains the status-dependent point cloud spatial region data; and when StatusDependent_flag is 0, it represents that the media asset does not contain the status-dependent point cloud spatial region data.

InitialStatusInformation( ) is used for representing the initial status information of the media asset.

SD_SpatialRegionsStruct( ) is used for representing status-dependent point cloud spatial region information, that is, information of partial regions in the point cloud media content. SD_SpatialRegionsStruct exists only when StatusDependent_flag is equal to 1.

V3CStatusChangeFeedback defines signaling used by the client to provide the current status information for the server side. Exemplarily, an example where viewing direction information and a real-time position of the user are added is shown in Table 2.

TABLE 2

Table of an implementation of a V3C application message containing the current status information

| Syntax | Values | No. of bits | Mnemonic |
|---|---|---|---|
| Application ( ){ | | | |
| message_id | | 16 | uimsbf |
| version | | 8 | uimsbf |
| length | | 16 | uimsbf |
| application_identifier( ) | | | |
| if (application_identifier | | | |
| =="urn:mpeg:mmt:app:v3c:2020") | | | |
| { | | 8 | uimsbf |
| app_message_type | | | |
| if(app_message_type == 0x01) { | | 32 | uimsbf |
| dirx | | 32 | uimsbf |
| diry | | 32 | uimsbf |
| dirz | | 32 | uimsbf |
| posx | | 32 | uimsbf |
| posy | | 32 | uimsbf |
| posz | | | |
| } | | | |
| } | | | |
| } | | | | message_id is used for representing an identifier of the V3C application message containing the current status information.

version is used for representing a version of status-dependent point cloud spatial region information. Information carried by a new version will cover any previous old version.

length is used for representing the length of the application message containing the current status information calculated in bytes, that is, the length from the next field to the last byte of the application message containing the current status information. A value of "0" is invalid in this field.

app_message_type is used for representing the type of the application message. For details, reference is made to Table 4.

posx is used for indicating an x-axis coordinate value of the current viewing position in the global coordinate system.

posy is used for indicating a y-axis coordinate value of the current viewing position in the global coordinate system.

posz is used for indicating a z-axis coordinate value of the current viewing position in the global coordinate system.

dirx is used for indicating an x-axis coordinate value of the current viewing direction in a local coordinate system with the current viewing position as the origin.

diry is used for indicating a y-axis coordinate value of the current viewing direction in the local coordinate system with the current viewing position as the origin.

dirz is used for indicating a z-axis coordinate value of the current viewing direction in the local coordinate system with the current viewing position as the origin.

In an embodiment, V3CStatusDependentPacketInformation is used for indicating the number of media data packets containing the status-dependent point cloud spatial region data and the status-dependent point cloud spatial region information by the server side to the client. Table 3 shows an example.

TABLE 3

Table of a V3C application message containing status-dependent point cloud spatial region information

| Syntax | Value | No. of bits | Mnemonic |
|---|---|---|---|
| Application( ) { | | | |
| message_id | | 16 | uimsbf |
| version | | 8 | uimsbf |
| length | | 16 | uimsbf |
| message_payload{ | | | |
| application_identifier( ) | | | |
| if(application_identifier == | | | |
|     "urn:mpeg:mmt:app:v3c:2020") | | | |
| { | | | |
| app_message_type | | 8 | uimsbf |
|   if(app_message_type == 0x02) { | | | |
|     reserverd | | 8 | bslbf uimsbf |
|     num_packet | | 8 | |
|     for (i = 0; i < N; i++) { | | | |
|       packet_id | | 16 | uimsbf |
|     } | | | |
|     SD_SpatialRegionsStruct() | | | |
|   } | | | |
| } | | | |
| } | | | |
| } | | | | message_id is used for representing an identifier of the application message containing the status-dependent point cloud spatial region information.

version is used for representing a version of the status-dependent point cloud spatial region information. Information carried by a new version will cover any previous old version.

length is used for representing the length of the application message containing the status-dependent point cloud spatial region information calculated in bytes, that is, the length from the next field to the last byte of the application message containing the status-dependent point cloud spatial region information. The value of "0" is invalid in this field.

app_message_type is used for representing the type of the application message. For details, reference is made to Table 4.

num_packet is used for representing the number of media data packets containing the status-dependent point cloud spatial region data.

packet_id is used for representing index information of the media data packets containing the status-dependent point cloud spatial region data.

SD_SpatialRegionsStruct( ) is used for representing the status-dependent point cloud spatial region information.

In an embodiment, defined types of the application messages are shown in Table 4 below.

TABLE 4

Table of types of V3C application messages

| Application Message Type | Application Message Name |
|---|---|
| 0x01 | V3CStatusChangeFeedback |
| 0x02 | V3CStatusDependentPacketInformation |
| 0x03-0xFF | Reserved for future use |

In an embodiment, to transmit point cloud content using the Information technology High efficiency multimedia coding—Part 6: Smart Media Transport (SMT) protocol and achieve the consumption of point cloud media content based on the user feedback information, media asset information description and signaling of a point cloud specific application need to be defined according to the specification, where an application signaling message is defined for the application program and allows information for the application program to be transferred.

To support the transfer of volumetric video content using the SMT, a single point cloud three-dimensional spatial region is written into an asset in the form of a volumetric video container, and one or more assets are encapsulated into data packets. Each data packet contains asset data of all multi-track content corresponding to the point cloud spatial region.

In the embodiment, the SMT defines the signaling message specific to the application program, and the message allows the signaling specific to the application program to be transferred. To transmit volumetric video coded data using an SMT stream, the signaling message specific to the volumetric video is defined below.

In the signaling message specific to the application program, the following application messages are defined:

Current status information is used for the client to transmit the current status information to the server side. Status-dependent point cloud spatial region information is used for the server side to indicate the number of data packets containing the status-dependent point cloud spatial region data, index information of the data packets and the corresponding status-dependent point cloud spatial region data to the client.

Media asset description information is used for notifying an SMT point cloud receiving entity and the application program of basic information currently carrying the point cloud media content, where the media asset description information includes a status dependent flag and media asset initial information.

In the embodiment, the implementation of the media asset description information achieved using the SMT transmission protocol is shown in Table 5.

TABLE 5

Table of an implementation of media asset description information

| Syntax | Values | Number of bits | Mnemonic |
|---|---|---|---|
| V3C_information_descriptor( ) { | | | |
| descriptor_tag | | 16 | uimsbf |
| descriptor_length | | 8 | uimsbf |
| reserved | | 7 | bslbf |
| StatusDependent_flag | | 1 | bslbf |
| InitialStatusInformation( ) | | | |
| if (StatusDependent_flag == 1) { | | | |
| SD_SpatialRegionsStruct( ) | | | |
| } | | | |
| } | | | | descriptor tag is used for representing the type of the media asset description information.

descriptor length is used for specifying a byte length from a byte next to this field to the last byte of the media asset description information.

reserved is used for representing a reserved byte bit.

StatusDependent_flag is used for indicating whether the media asset corresponding to the media asset description information contains status-dependent point cloud spatial region data corresponding to the initial status information. For example, when StatusDependent_flag is 1, it represents that the media asset contains the status-dependent point cloud spatial region data; and when StatusDependent_flag is 0, it represents that the media asset does not contain the status-dependent point cloud spatial region data.

InitialStatusInformation( ) is used for representing the initial status information of the media asset.

SD_SpatialRegionsStruct( ) is used for representing status-dependent point cloud spatial region information, that is, information of partial regions in the point cloud media content.

In an embodiment, when point cloud media consumption is provided using the current status information, the current status information is transmitted between the server side and the client. When the current status information needs to be sent between the server side and the client in the point cloud media consumption, the application message is used for conversation. The SMT receiving entity regularly feeds back position information or direction information of a virtual camera or position information or direction information of a user to an SMT sending entity, so that the client may obtain corresponding partial point cloud media data. In the embodiment, the implementation of the current status information achieved using the SMT transmission protocol is shown in Table 6.

TABLE 6

Table of an implementation of an application message containing current status information

| Syntax | Values | Number of bits | Mnemonic |
|---|---|---|---|
| V3Cinteraction_feedback_message( ) { | | | |
|   message_id | | 16 | uimsbf |
|   version | | 8 | uimsbf |
|   length | | 32 | uimsbf |
|   message_payload { | | | |
|     message_source | Bool | 1 | uimsbf |
|     reserved | | 6 | uimsbf |
|     interaction_content{ | | | |
|       posx | | 32 | uimsbf |
| posy | | 32 | uimsbf |
| posz | | 32 | uimsbf |
| dirx | | 32 | uimsbf |
| diry | | 32 | uimsbf |
| dirz | | 32 | uimsbf |
|     } | | | |
|   } | | | |
| } | | | | message_id is used for representing an identifier of the current status information.

version is used for representing a version of the current status information. Information carried by a new version will cover any previous old version.

length is used for indicating the length of the current status information calculated in bytes, that is, the length from the next field to the last byte of the current status information. The value of "0" is invalid in this field.

message_source is used for indicating a message source, where 0 represents that the current status information is sent from the client to the server side, and 1 represents that the current status information is sent from the server side to the client. This value is set to 0 here.

reserved represents a reserved byte bit.

posx is used for indicating an x-axis coordinate value of the current viewing position in the global coordinate system.

posy is used for indicating a y-axis coordinate value of the current viewing position in the global coordinate system.

posz is used for indicating a z-axis coordinate value of the current viewing position in the global coordinate system.

dirx is used for indicating an x-axis coordinate value of the current viewing direction in the local coordinate system with the current viewing position as the origin.

diry is used for indicating a y-axis coordinate value of the current viewing direction in the local coordinate system with the current viewing position as the origin.

dirz is used for indicating a z-axis coordinate value of the current viewing direction in the local coordinate system with the current viewing position as the origin.

In an embodiment, it is defined that the server side indicates the status-dependent point cloud spatial region information to the client. In this scheme, the status-dependent point cloud spatial region information needs to be added additionally. In the embodiment, the implementation of the status-dependent point cloud spatial region information achieved using the SMT transmission protocol is shown in Table 7.

TABLE 7

Table of an implementation of an application message containing status-dependent point cloud spatial region information

| Syntax | Values | Number of bits | Mnemonic |
|---|---|---|---|
| V3C_Satusdependent_packet_message( ) { | | | |
|   message_id | | 16 | uimsbf |
|   version | | 8 | uimsbf |
|   length | | 32 | uimsbf |
|   message_payload { | | | |
|     message_source | Bool | 1 | uimsbf |
|     reserved | | 6 | uimsbf |
|     num_packet | N | 8 | uimsbf |
|     for (i = 0; i < N; i++) { | | | |
|       packet_id | | 16 | uimsbf |
|     } | | | |
|     SD_SpatialRegionsStruct( ) | | | |
|   } | | | |
| } | | | | message_id is used for representing an identifier of the status-dependent point cloud spatial region information.

version is used for representing a version of the status-dependent point cloud spatial region information. Information carried by a new version will cover any previous old version.

length is used for representing the length of current status information calculated in bytes, that is, the length from the next field to the last byte of the current status information. The value of "0" is invalid in this field.

message_source is used for representing a message source, where 0 represents that the current status information is sent from the client to the server side, and 1 represents that the current status information is sent from the server side to the client. This value is set to 1 here.

reserved represents a reserved byte bit.

num_packet is used for representing the number of media data packets containing the status-dependent point cloud spatial region data.

packet_id is used for representing index information of the media data packets containing the status-dependent point cloud spatial region data.

SD_SpatialRegionsStruct( ) is used for representing the status-dependent point cloud spatial region information.

Figure 6:
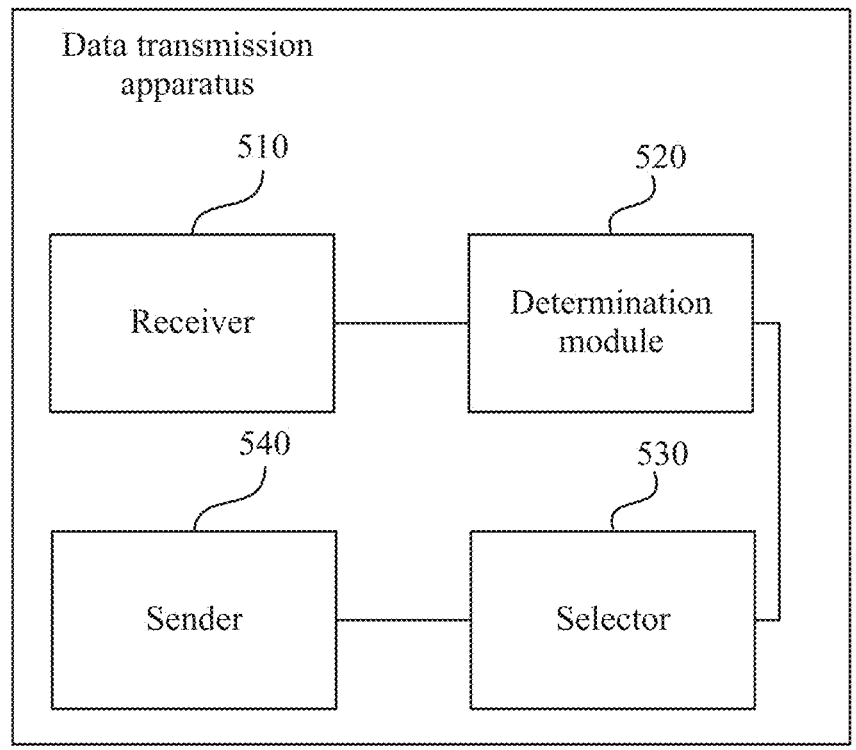
FIG. 6 is a block diagram of a data transmission apparatus according to an embodiment of the present application.

In an embodiment, FIG. 6 is a block diagram of a data transmission apparatus according to an embodiment of the present application. The embodiment may be executed by a server side. As shown in FIG. 6, the embodiment includes a receiver 510, a determination module 520, a selector 530 and a sender 540.

The receiver 510 is configured to receive current status information sent by a client; the determination module 520 is configured to determine corresponding status-dependent point cloud spatial region information according to the current status information; the selector 530 is configured to select status-dependent point cloud spatial region data corresponding to the status-dependent point cloud spatial region information; and the sender 540 is configured to send the status-dependent point cloud spatial region information and the status-dependent point cloud spatial region data to the client.

In an embodiment, in the data transmission apparatus applied to the server side, the receiver 510 is further configured to, before receiving the current status information sent by the client, receive a media asset request sent by the client; and the sender 540 is further configured to send media asset description information corresponding to the media asset request to the client.

In an embodiment, the media asset description information includes a status dependent flag and media asset initial information. The status dependent flag is used for indicating whether a media asset corresponding to the media asset description information contains status-dependent point cloud spatial region data corresponding to the media asset initial information.

In an embodiment, the media asset initial information includes initial status information and status-dependent point cloud spatial region information.

In an embodiment, the initial status information includes one of the following: media asset initial viewing information; initial body position information of a user using the client and an initial body direction of the user using the client; an initial position of the user using the client and initial movement information of the user using the client; an initial partial-body position of the user using the client and an initial partial-body motion of the user using the client; or last status information when the client uses the current media asset last time. The media asset initial viewing information includes one of an initial viewing position of the user or an initial viewing direction of the user.

In an embodiment, in the data transmission apparatus applied to the server side, the receiver 510 is further configured to receive a request, sent by the client, for the status-dependent point cloud spatial region information and status-dependent point cloud spatial region data both corresponding to the initial status information; and the sender 540 is further configured to send the status-dependent point cloud spatial region information and the status-dependent point cloud spatial region data both corresponding to the initial status information to the client.

In an embodiment, the current status information includes one of the following: a current viewing position of a user using the client and a current viewing direction of the user using the client; a current body position of the user using the client and a current body direction of the user using the client; a current position of the user using the client and current movement information of the user using the client; or a current partial-body position of the user using the client and a current partial-body motion of the user using the client.

In an embodiment, the representation manners of the current viewing position, the body position of the user, the current position of the user, the partial-body position of the user and the initial viewing position of the user all include three-dimensional coordinates in the global coordinate system. A representation manner of the initial viewing direction of the user includes a unit vector of a local coordinate system with the initial viewing position of the user as the origin. A representation manner of the body direction of the user includes a unit vector of a local coordinate system with the body position of the user as the origin. A representation manner of the current viewing direction includes a unit vector of a local coordinate system with the current viewing position as the origin.

In an embodiment, the status-dependent point cloud spatial region information includes one of the following: the number of spatial regions, a spatial region index, an anchor of each spatial region, the shape of each spatial region, or the size of each spatial region.

The data transmission apparatus provided in the embodiment is configured to implement the data transmission method of the embodiment shown in FIG. 1, and the data transmission apparatus provided in the present embodiment has similar implementation principles and technical effects which are not repeated here.

Figure 7:
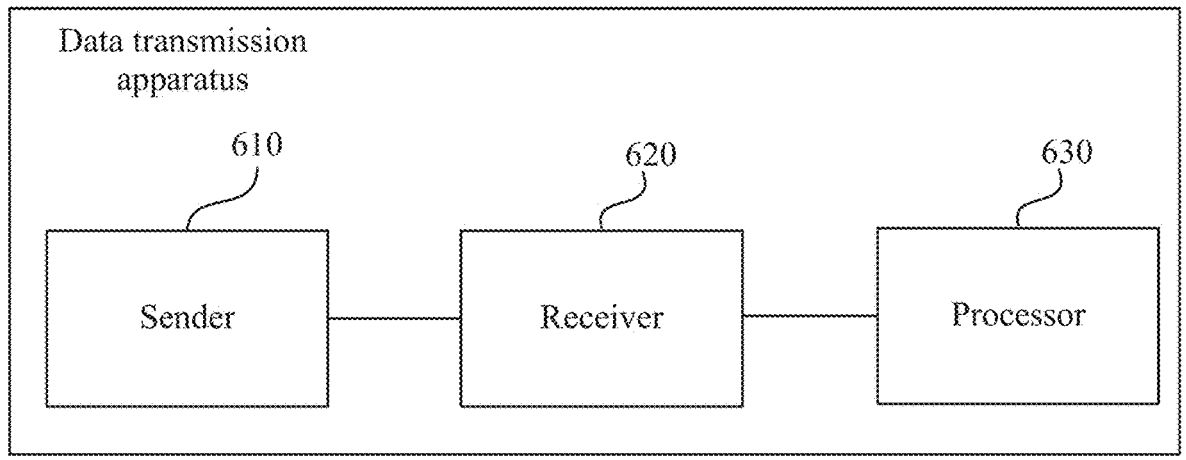
FIG. 7 is a block diagram of another data transmission apparatus according to an embodiment of the present application.

In an embodiment, FIG. 7 is a block diagram of another data transmission apparatus according to an embodiment of the present application. The embodiment may be executed by a client. As shown in FIG. 7, the embodiment includes a sender 610, a receiver 620 and a processor 630.

The sender 610 is configured to send pre-acquired current status information to a server side; the receiver 620 is configured to receive status-dependent point cloud spatial region information and status-dependent point cloud spatial region data which correspond to the pre-acquired current status information and are sent by the server side; and the processor 630 is configured to process the status-dependent point cloud spatial region information and the status-dependent point cloud spatial region data.

In an embodiment, in the data transmission apparatus applied to the client, the sender 610 is further configured to, before sending the pre-acquired current status information to the server side, send a media asset request to the server side; and the receiver 620 is further configured to receive media asset description information corresponding to the media asset request and sent by the server side.

In an embodiment, the media asset description information includes a status dependent flag and media asset initial information. The status dependent flag is used for indicating whether a media asset corresponding to the media asset description information contains status-dependent point cloud spatial region data corresponding to the media asset initial information.

In an embodiment, the media asset initial information includes initial status information and status-dependent point cloud spatial region information.

In an embodiment, in the data transmission apparatus applied to the client, the sender 610 is further configured to send a request for the status-dependent point cloud spatial region information and status-dependent point cloud spatial region data which correspond to the initial status information to the server side; and the receiver 620 is further configured to, before the pre-acquired current status information is sent to the server side, receive the status-dependent point cloud spatial region information and the status-dependent point cloud spatial region data both corresponding to the initial status information and sent by the server side.

The data transmission apparatus provided in the embodiment is configured to implement the data transmission method of the embodiment shown in FIG. 2, and the data transmission apparatus provided in the present embodiment has similar implementation principles and technical effects which are not repeated here.

Figure 8:
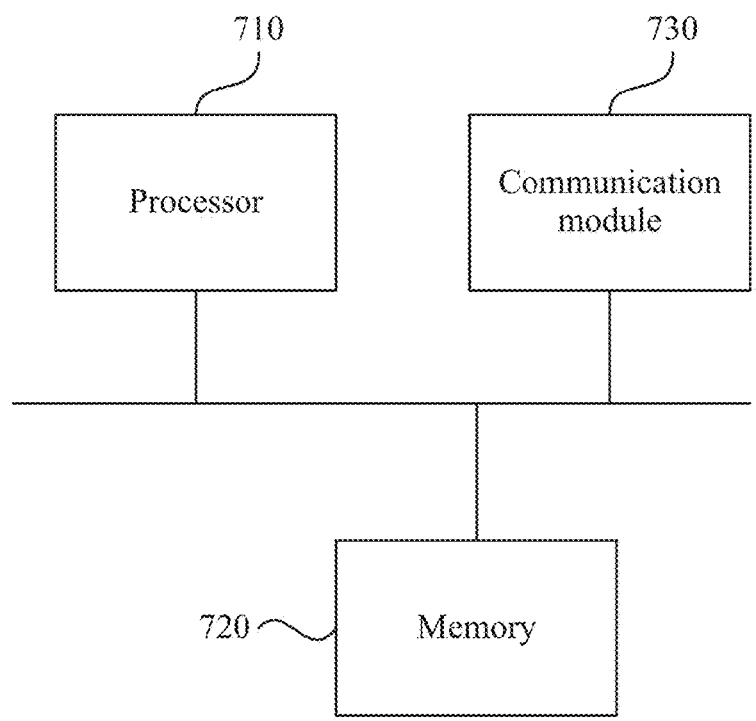
FIG. 8 is a structural diagram of a data transmission device according to an embodiment of the present application.

FIG. 8 is a structural diagram of a data transmission device according to an embodiment of the present application. As shown in FIG. 8, the data transmission device provided in the present application includes a processor 710, a memory 720 and a communication module 730. One or more processors 710 may be provided in the data transmission device, with one processor 710 shown as an example in FIG. 8. One or more memories 720 may be provided in the data transmission device, with one memory 720 shown as an example in FIG. 8. The processor 710, the memory 720 and the communication module 730 in the data transmission device may be connected via a bus or in other manners. FIG. 8 shows the connection via a bus as an example. In the embodiment, the data transmission device may be a server side (for example, a base station).

As a computer-readable storage medium, the memory 720 may be configured to store software programs and computer-executable programs and modules, such as program instructions/modules (for example, the receiver 510, the determination module 520, the selector 530 and the sender 540 that are in the data transmission apparatus) corresponding to the data transmission device according to an embodiment of the present application. The memory 720 may include a program storage region and a data storage region, where the program storage region may store an operating system and an application program required by at least one function, and the data storage region may store data created depending on the use of the device. Additionally, the memory 720 may include a high-speed random-access memory and may also include a nonvolatile memory, such as at least one magnetic disk memory, a flash memory or another nonvolatile solid-state memory. In some examples, the memory 720 may include memories which are remotely disposed relative to the processor 710, and these remote memories may be connected to the device via a network. Examples of the preceding network include, but are not limited to, the Internet, an intranet, a local area network, a mobile communication network and a combination thereof.

The communication module 730 is configured to perform communication and interaction between the server side and the client.

The preceding data transmission device may be configured to perform the data transmission method applied to the server side provided in any preceding embodiment and has corresponding functions and effects.

In a case where the data transmission device is a client (for example, a user equipment), the preceding data transmission device may be configured to perform the data transmission method applied to the client provided in any preceding embodiment and has corresponding functions and effects.

An embodiment of the present application further provides a storage medium including computer-executable instructions which, when executed by a computer processor, are configured to execute the data transmission method applied to a server side. The method includes the following: current status information sent by a client is received; corresponding status-dependent point cloud spatial region information is determined according to the current status information; status-dependent point cloud spatial region data corresponding to the status-dependent point cloud spatial region information is selected; and the status-dependent point cloud spatial region information and the status-dependent point cloud spatial region data are sent to the client.

An embodiment of the present application further provides a storage medium including computer-executable instructions which, when executed by a computer processor, are configured to execute the data transmission method applied to a client. The method includes the following: pre-acquired current status information is sent to a server side; status-dependent point cloud spatial region information and status-dependent point cloud spatial region data both corresponding to the pre-acquired current status information and sent by the server side are received; and the status-dependent point cloud spatial region information and the status-dependent point cloud spatial region data are processed.

It is to be understood by those skilled in the art that the term user equipment covers any suitable type of wireless user equipment, for example, a mobile phone, a portable data processing device, a portable web browser or a vehicle-mounted mobile station.

Generally speaking, various embodiments of the present application may be implemented in hardware or special-purpose circuits, software, logic or any combination thereof. For example, some aspects may be implemented in hardware while other aspects may be implemented in firmware or software executable by a controller, a microprocessor or another computing device, though the present application is not limited thereto.

Embodiments of the present application may be implemented through the execution of computer program instructions by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules and functions, or may represent a combination of program steps and logic circuits, modules and functions. Computer programs may be stored in a memory. The memory may be of any type suitable for a local technical environment and may be implemented using any suitable data storage technology such as, but not limited to, a read-only memory (ROM), a random-access memory (RAM), or an optical memory device and system (a digital video disc (DVD) or a compact disc (CD)). Computer-readable media may include non-transitory storage media. The data processor may be of any type suitable for the local technical environment such as, but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

What is claimed is:

1. A data transmission method, being applied to a server side and comprising:
   receiving current status information sent by a client;
   determining, according to the current status information, status-dependent point cloud spatial region information corresponding to the current status information;
   selecting status-dependent point cloud spatial region data corresponding to the status-dependent point cloud spatial region information; and
   sending the status-dependent point cloud spatial region information and the status-dependent point cloud spatial region data to the client;
   wherein determining, according to the current status information, the status-dependent point cloud spatial region information corresponding to the current status information comprises one of the following:
      selecting a point cloud region with a preset shape according to the current status information, and determining information about the selected point cloud region as the status-dependent point cloud spatial region information;
      determining a position of a next movement status of a user using the client and an orientation of the next movement status according to current position information of the user, current orientation information of the user and movement information of the user which are included in the current status information, and determining point cloud spatial region information corresponding to the position and the orientation as the status-dependent point cloud spatial region information; or
      determining a spatial region touched by a hand of a user using the client according to a hand position of the user and a hand motion of the user which are included in the current status information, and using information about the spatial region touched by the hand as the status-dependent point cloud spatial region information.

2. The method according to claim 1, before receiving the current status information sent by the client, further comprising:
   receiving a media asset request sent by the client; and
   sending media asset description information corresponding to the media asset request to the client.

3. The method according to claim 2, wherein the media asset description information comprises: a status dependent flag and media asset, wherein the status dependent flag is used for indicating whether a media asset corresponding to the media asset description information contains status-dependent point cloud spatial region data corresponding to the media asset.

4. The method according to claim 3, wherein the media asset comprises: initial status information and status-dependent point cloud spatial region information corresponding to the initial status information.

5. The method according to claim 4, wherein the initial status information comprises one of the following: media asset initial viewing information; initial body position information of the user using the client and an initial body direction of the user using the client; an initial position of the user using the client and initial movement information of the user using the client; an initial partial-body position of the user using the client and an initial partial-body motion of the user using the client; or last status information in a case of a last use of a current media asset by the client;
   wherein the media asset initial viewing information comprises one of the following: an initial viewing position of the user or an initial viewing direction of the user.

6. The method according to claim 4, further comprising:
   receiving a request, sent by the client, for the status-dependent point cloud spatial region information and status-dependent point cloud spatial region data which correspond to the initial status information; and
   sending the status-dependent point cloud spatial region information and the status-dependent point cloud spatial region data which correspond to the initial status information to the client.

7. The method according to claim 2, wherein the status-dependent point cloud spatial region information comprises one of the following: a number of spatial regions, a spatial region index, an anchor of each spatial region, a shape of each spatial region, or a size of each spatial region.

8. The method according to claim 1, wherein the current status information comprises one of the following: a current viewing position of a user using the client and a current viewing direction of the user using the client; a current body position of a user using the client and a current body direction of the user using the client; a current position of a user using the client and current movement information of the user using the client; or a current partial-body position of a user using the client and a current partial-body motion of the user using the client.

9. The method according to claim 8, wherein representation manners of the current viewing position, the current body position, the current position, the current partial-body position and an initial viewing position all comprise three-dimensional coordinates in a global coordinate system;
   a representation manner of an initial viewing direction comprises a unit vector of a local coordinate system with the initial viewing position as an origin;
   a representation manner of the current body direction comprises a unit vector of a local coordinate system with the current body position as an origin; and
   a representation manner of the current viewing direction comprises a unit vector of a local coordinate system with the current viewing position as an origin.

10. The method according to claim 1, wherein the status-dependent point cloud spatial region information comprises one of the following: a number of spatial regions, a spatial region index, an anchor of each spatial region, a shape of each spatial region, or a size of each spatial region.

11. A non-transitory storage medium storing a computer program which, when executed by a processor, implements the data transmission method according to claim 1.

12. A data transmission method, being applied to a client and comprising:
   sending pre-acquired current status information to a server side;
   receiving status-dependent point cloud spatial region information and status-dependent point cloud spatial region data both corresponding to the pre-acquired current status information and sent by the server side, wherein the status-dependent point cloud spatial region information comprises one of:
      information about a point cloud region with a preset shape and selected according to the pre-acquired current status information;
      point cloud spatial region information corresponding to a position and an orientation of a next movement status of a user using the client and determined according to current position information of the user, current orientation information of the user and movement information of the user which are included in the pre-acquired current status information; or information about a spatial region touched by a hand of a user using the client and determined according to a hand position of the user and a hand motion of the user which are included in the pre-acquired current status information; and processing the status-dependent point cloud spatial region information and the status-dependent point cloud spatial region data.

13. The method according to claim 12, before sending the pre-acquired current status information to the server side, further comprising:

sending a media asset request to the server side; and receiving media asset description information corresponding to the media asset request and sent by the server side.

14. The method according to claim 13, wherein the media asset description information comprises: a status dependent flag and media asset, wherein the status dependent flag is used for indicating whether a media asset corresponding to the media asset description information contains status-dependent point cloud spatial region data corresponding to the media asset.

15. The method according to claim 14, wherein the media asset comprises: initial status information and status-dependent point cloud spatial region information corresponding to the initial status information.

16. The method according to claim 15, further comprising:

sending a request for the status-dependent point cloud spatial region information and status-dependent point cloud spatial region data both corresponding to the initial status information to the server side; and receiving the status-dependent point cloud spatial region information and the status-dependent point cloud spatial region data both corresponding to the initial status information and sent by the server side.

17. A data transmission device, comprising: a communication module, a memory and at least one processor, wherein the communication module is configured to perform communication and interaction between a server side and a client; and the memory is configured to store at least one program;

wherein the at least one program, when executed by the at least one processor, causes the at least one processor to implement the data transmission method according to claim 12.

18. A non-transitory storage medium storing a computer program which, when executed by a processor, implements the data transmission method according to claim 12.

19. A data transmission device, comprising: a communication module, a memory and at least one processor, wherein the communication module is configured to perform communication and interaction between a server side and a client; and the memory is configured to store at least one program;

wherein the at least one program, when executed by the at least one processor, causes the at least one processor to implement the following:

receiving current status information sent by the client;

determining, according to the current status information, status-dependent point cloud spatial region information corresponding to the current status information;

selecting status-dependent point cloud spatial region data corresponding to the status-dependent point cloud spatial region information; and sending the status-dependent point cloud spatial region information and the status-dependent point cloud spatial region data to the client;

wherein the at least one processor is caused to implement determining, according to the current status information, the status-dependent point cloud spatial region information corresponding to the current status information by one of the following:

selecting a point cloud region with a preset shape according to the current status information, and determining information about the selected point cloud region as the status-dependent point cloud spatial region information;

determining a position of a next movement status of a user using the client and an orientation of the next movement status according to current position information of the user, current orientation information of the user and movement information of the user which are included in the current status information, and determining point cloud spatial region information corresponding to the position and the orientation as the status-dependent point cloud spatial region information; or determining a spatial region touched by a hand of a user using the client according to a hand position of the user and a hand motion of the user which are included in the current status information, and using information about the spatial region touched by the hand as the status-dependent point cloud spatial region information.

20. The data transmission device according to claim 19, wherein before the current status information sent by the client is received, the at least one processor is caused to further implement:

receiving a media asset request sent by the client; and sending media asset description information corresponding to the media asset request to the client.

* * * * *